(12) United States Patent
Hall et al.

(10) Patent No.: US 9,814,307 B1
(45) Date of Patent: Nov. 14, 2017

(54) REMOVABLE TABLETOP WITH REPLACEABLE ADHESIVES

(71) Applicants: David R. Hall, Provo, UT (US);
William H. Reynolds, Orem, UT (US);
Christopher Reynolds, Orem, UT (US); Joseph Blanch, Provo, UT (US);
Joe Fox, Spanish Fork, UT (US);
Nathan Davis, Bountiful, UT (US)

(72) Inventors: David R. Hall, Provo, UT (US);
William H. Reynolds, Orem, UT (US);
Christopher Reynolds, Orem, UT (US); Joseph Blanch, Provo, UT (US);
Joe Fox, Spanish Fork, UT (US);
Nathan Davis, Bountiful, UT (US)

( * ) Notice: Subject to any disclaimer, the term of this patent is extended or adjusted under 35 U.S.C. 154(b) by 0 days.

(21) Appl. No.: 15/603,948

(22) Filed: May 24, 2017

(51) Int. Cl.
*A47B 37/00* (2006.01)
*A47B 13/00* (2006.01)
*A47B 13/04* (2006.01)
*A47B 13/06* (2006.01)
*A47B 13/08* (2006.01)
*A47B 13/12* (2006.01)
(Continued)

(52) U.S. Cl.
CPC .............. *A47B 13/003* (2013.01); *A47B 13/04* (2013.01); *A47B 13/06* (2013.01); *A47B 13/086* (2013.01); *A47B 13/12* (2013.01); *A47B 21/04* (2013.01); *A47B 25/00* (2013.01); *A47B 27/00* (2013.01); *A47B 33/00* (2013.01); *A47B 37/00* (2013.01); *A47B 88/40* (2017.01); *A61G 13/009* (2013.01); *B25H 1/02* (2013.01); *F16B 47/003* (2013.01); *A47B 2200/008* (2013.01); *A47B 2200/0073* (2013.01); *A47B 2200/0079* (2013.01); *A47B 2200/0084* (2013.01)

(58) Field of Classification Search
CPC ........ A47B 13/003; A47B 13/04; A47B 13/06; A47B 13/086; A47B 13/12; A47B 13/009; A47B 88/40; A47B 21/04; A47B 25/00; A47B 27/00; A47B 33/00; A47B 37/00; A47B 2200/0073; A47B 2200/0079; A47B 2200/008; A47B 2200/0084; A61G 13/009; B25H 1/02; F16B 47/003
See application file for complete search history.

(56) References Cited

U.S. PATENT DOCUMENTS 3,979,156 A * 9/1976 Gross ................. A47B 13/08
108/91
4,599,950 A * 7/1986 Evans ................. A47B 13/12
108/150

(Continued)

*Primary Examiner* — Hanh V Tran

(57) ABSTRACT

A table is disclosed. The table comprises a table base and tabletop. The table base comprises a top surface with a replaceable adhesive layer attached. The tabletop comprises a first usable side and a second usable side, the first usable side and the second usable side being alternately attached to the replaceable adhesive layer once the adhesive is cut, removed, and replaced. The top surface further comprises a rounded edge that acts to guide the entry of an adhesive cutting wire. The replaceable adhesive layer comprises embedded wire guides that define a cutting zone substantially the width of the cutting wire through the adhesive. The embedded wire guides restrict the cutting wire to the cutting zone while the adhesive is being cut, thereby allowing the first usable side and the second usable side to be alternately attached to the adhesive layer.

20 Claims, 22 Drawing Sheets

(51) Int. Cl.

| | |
|---|---|
| *A47B 21/04* | (2006.01) |
| *A47B 25/00* | (2006.01) |
| *A47B 27/00* | (2006.01) |
| *A47B 33/00* | (2006.01) |
| *A47B 88/40* | (2017.01) |
| *A61G 13/00* | (2006.01) |
| *F16B 47/00* | (2006.01) |
| *B25H 1/02* | (2006.01) |

(56) References Cited

U.S. PATENT DOCUMENTS

| | | | | |
|---|---|---|---|---|
| 5,865,129 | A * | 2/1999 | Samples | A47B 3/12 108/157.17 |
| 6,823,804 | B2 * | 11/2004 | Arnell | A47B 13/08 108/13 |
| 8,480,091 | B1 * | 7/2013 | Florence | A63F 3/00157 273/309 |
| 2004/0011260 | A1 * | 1/2004 | Choi | A47B 13/02 108/153.1 |
| 2007/0039101 | A1 * | 2/2007 | Luginbuhl | A61B 5/0555 5/600 |
| 2008/0011206 | A1 * | 1/2008 | Warriner | A47B 13/003 108/150 |
| 2009/0217845 | A1 * | 9/2009 | Wang | A47B 13/12 108/29 |
| 2011/0083588 | A1 * | 4/2011 | Davis | A47B 13/086 108/42 |
| 2016/0113390 | A1 * | 4/2016 | Dias | A47B 13/003 108/25 |
| 2017/0251806 | A1 * | 9/2017 | Newman | A47B 21/02 |
| 2017/0258246 | A1 * | 9/2017 | Schwalbach | A47F 3/001 |

* cited by examiner

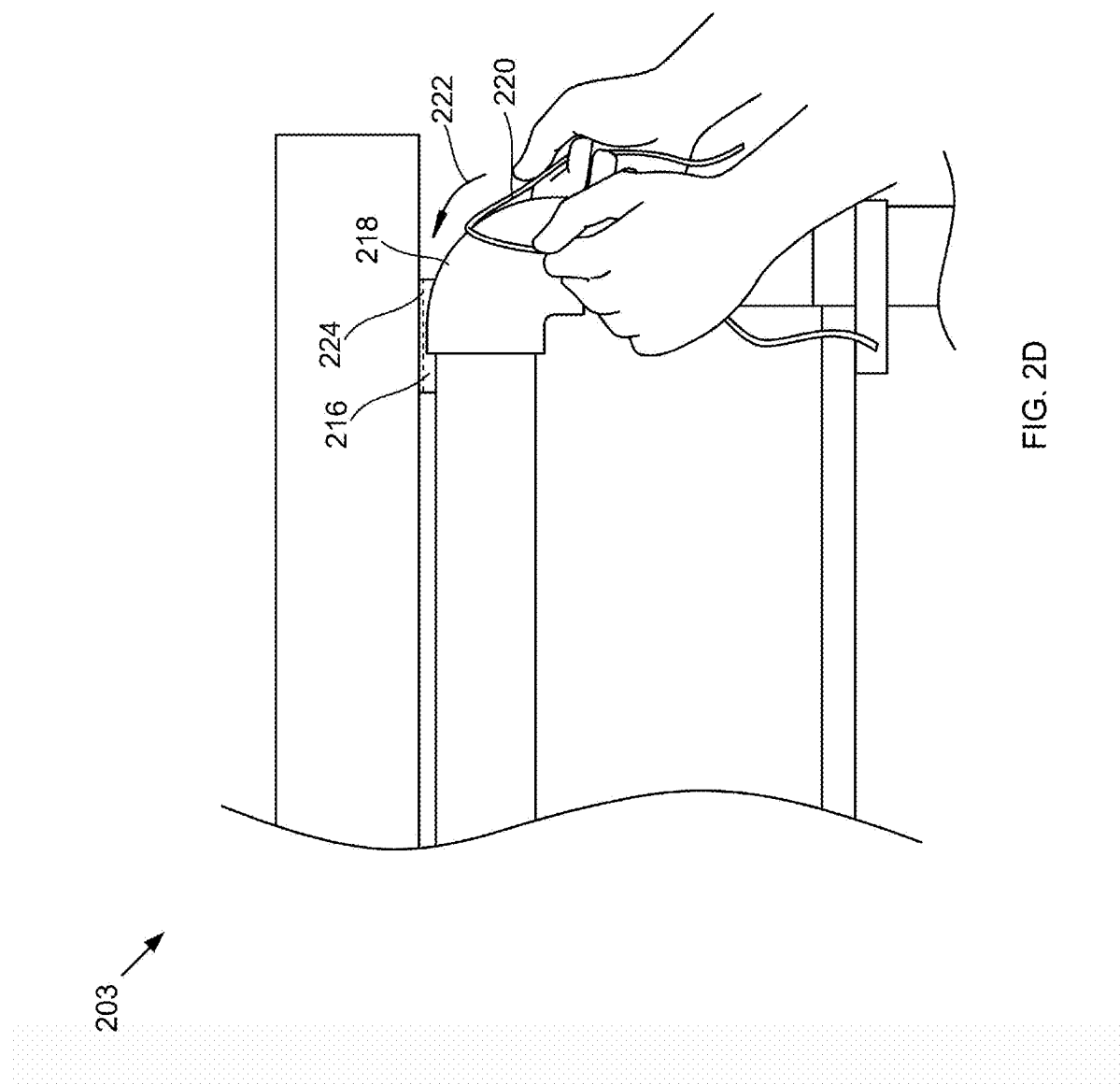

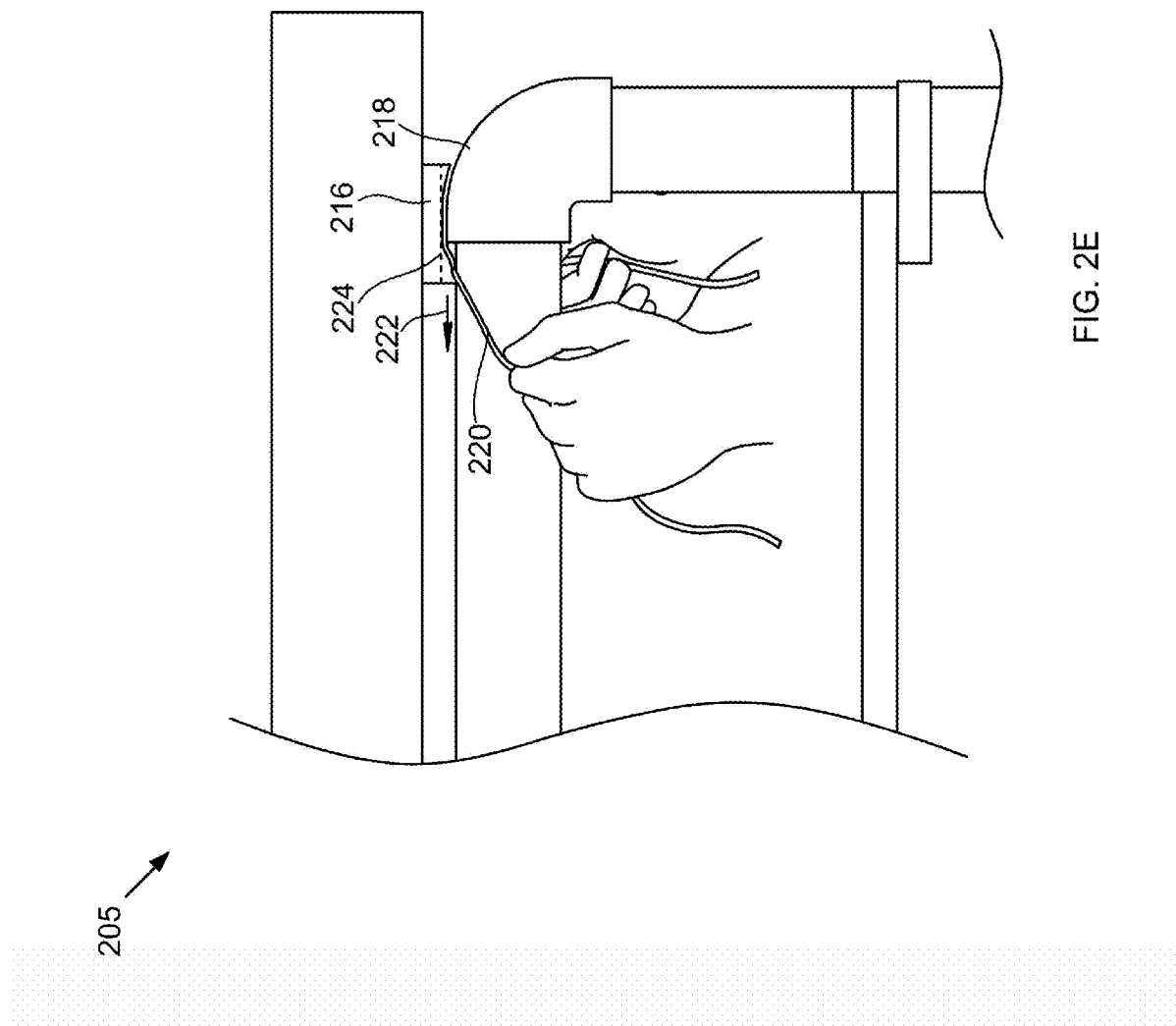

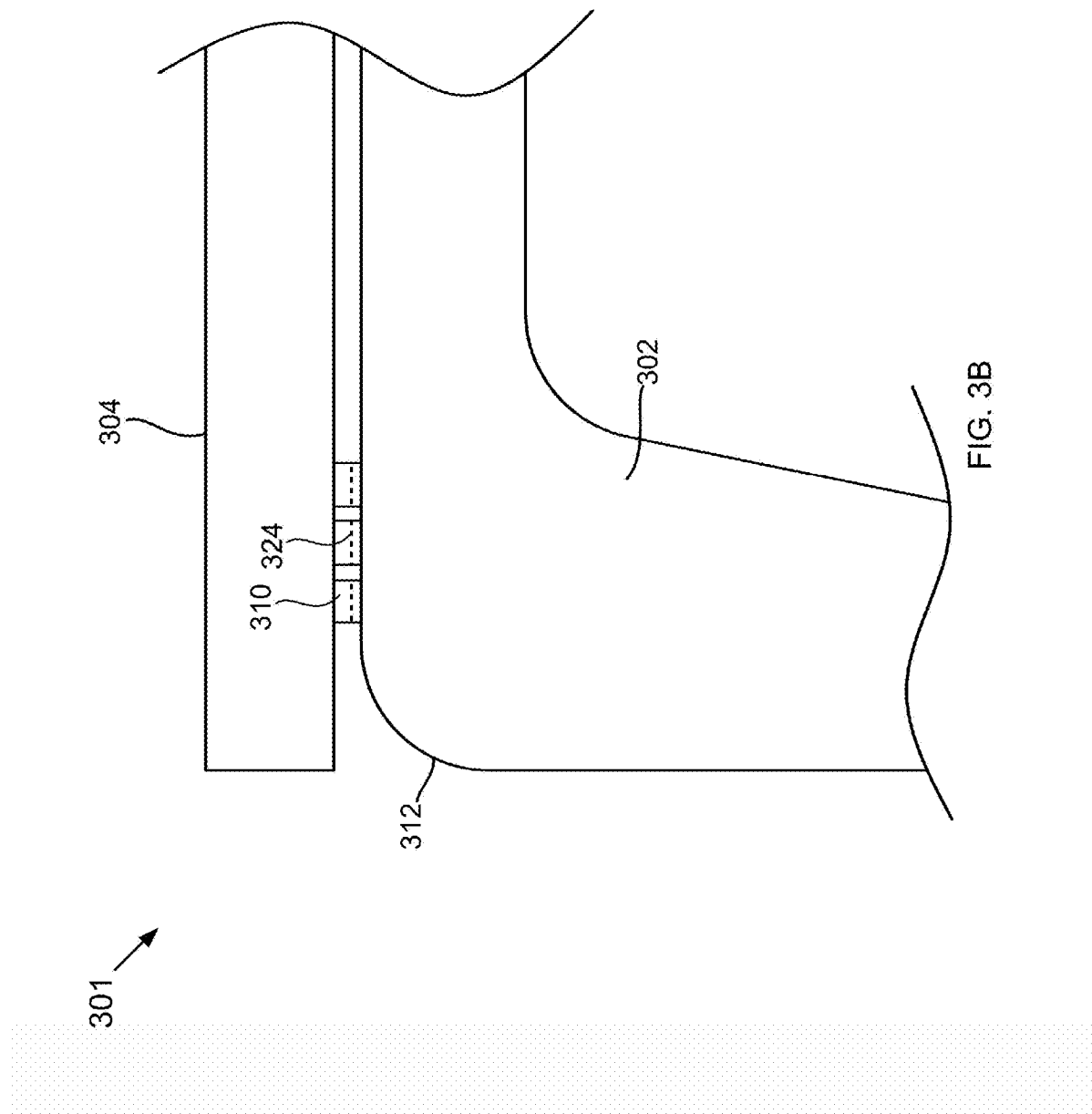

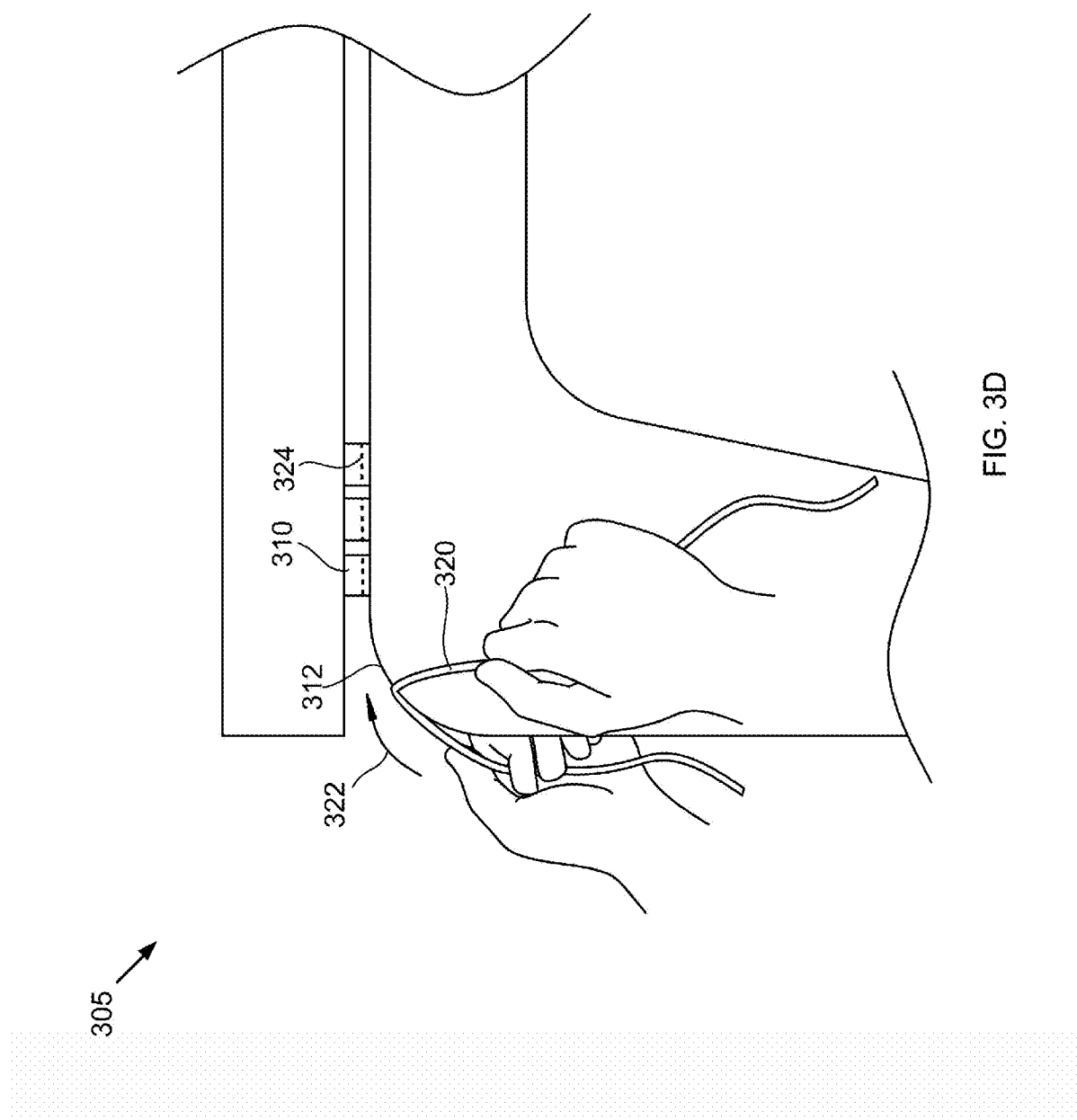

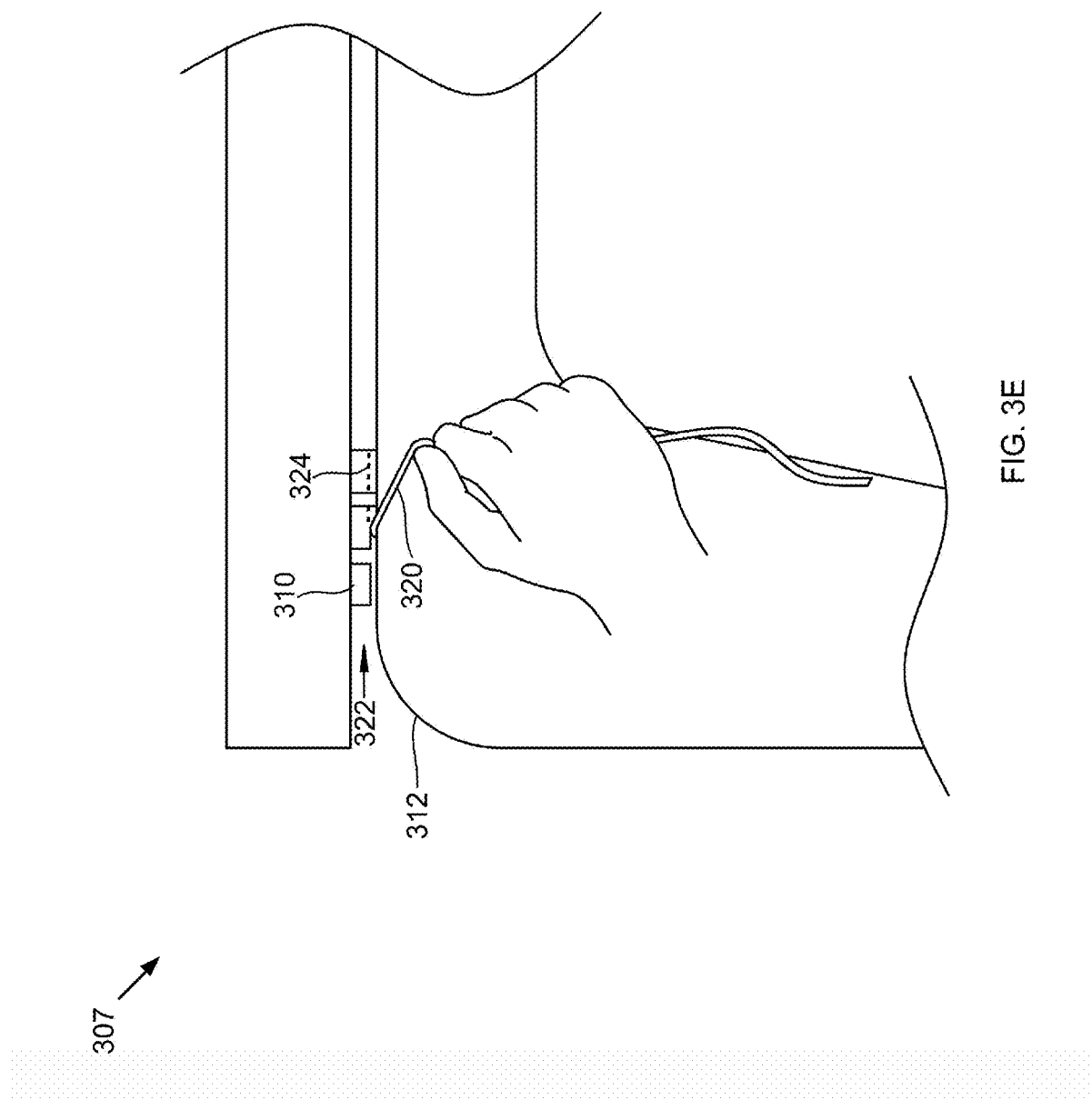

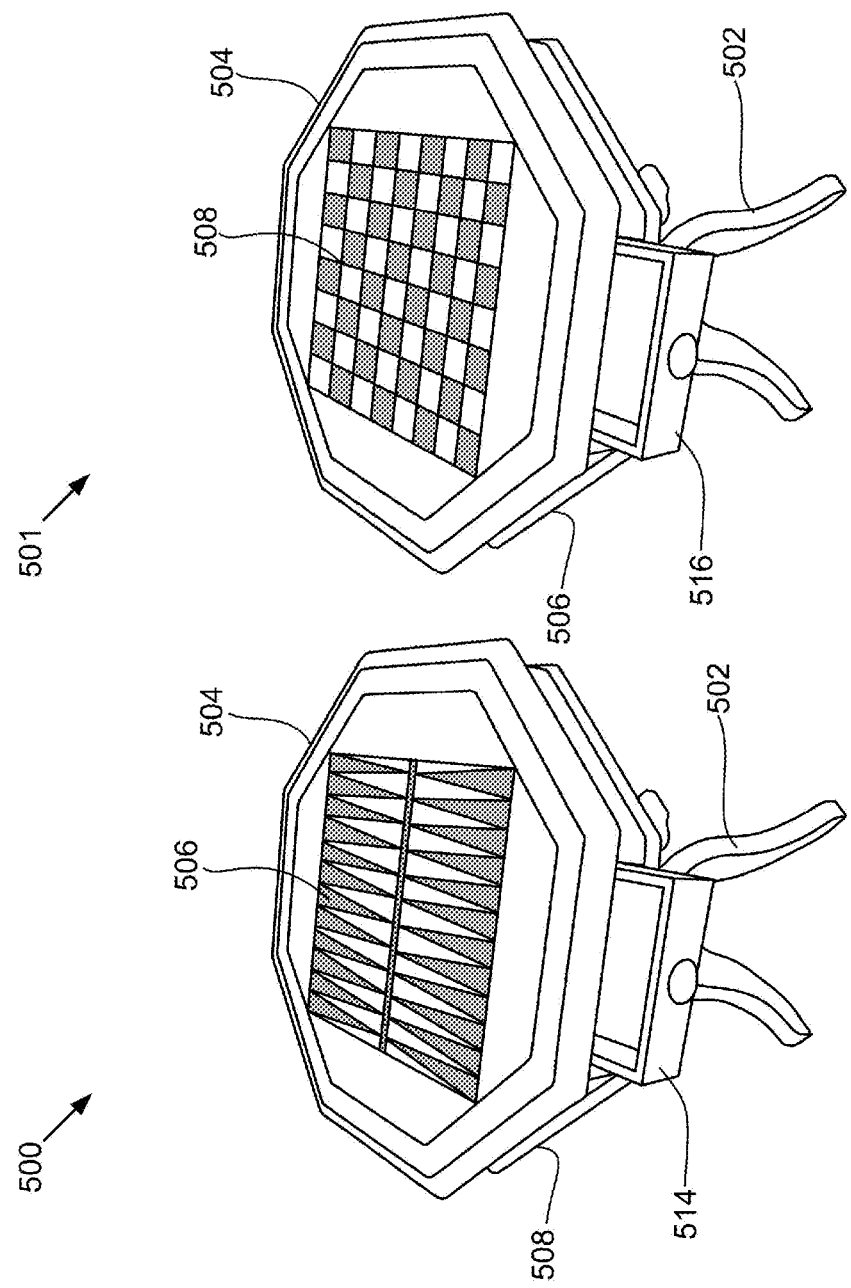

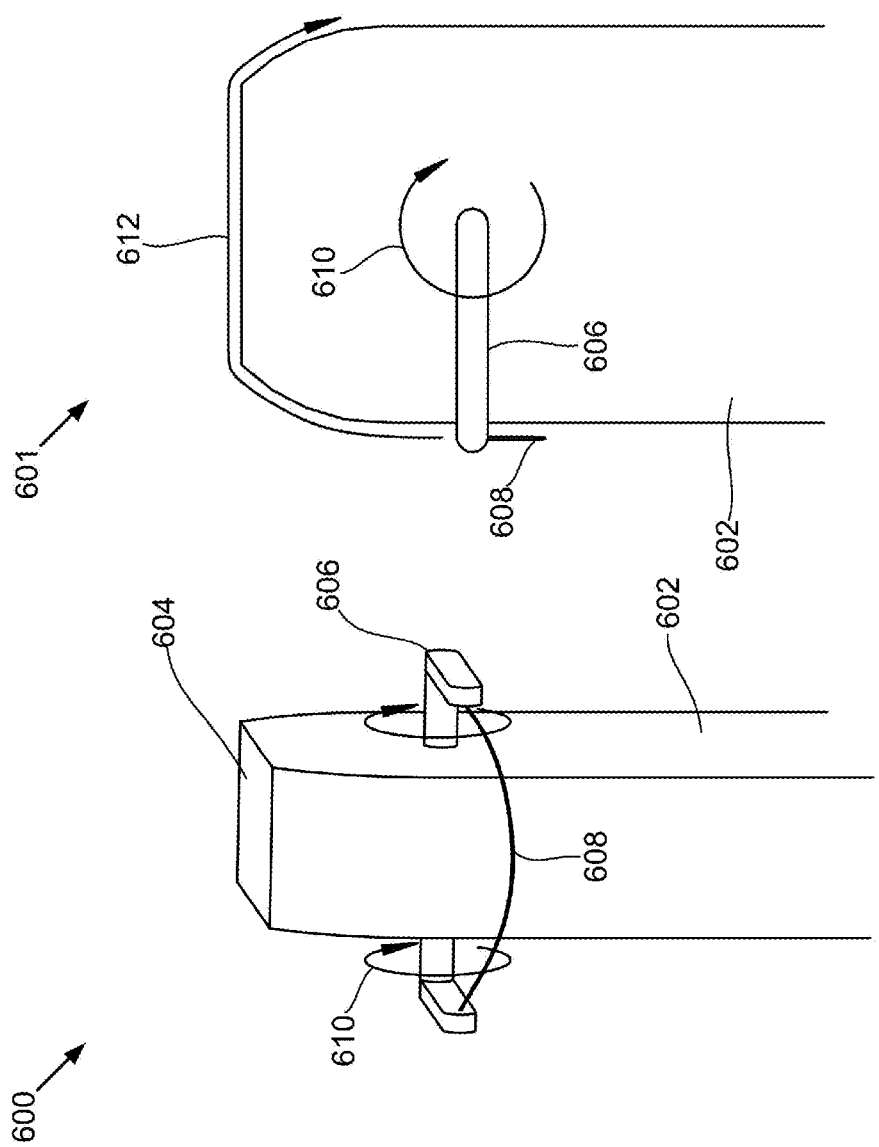

REMOVABLE TABLETOP WITH REPLACEABLE ADHESIVES

FIELD OF THE INVENTION

This invention relates generally to tables with interchangeable tabletops. More particularly, we are interested in tabletops wherein both sides can be attached via replaceable adhesives.

BACKGROUND

The table has been in use for the duration of recorded history in various forms. Tables are attached in many ways, such as bolts, clamps, and compression. However, tables are almost universally a one-sided device. One side is used for the tabletop, with the other side acting as the attachment point. This limits the table to having one surface. The ability to interchangeably utilize both sides of a tabletop without the need for attachment methods that leave holes, damage surfaces, or require extensive effort is needed.

U.S. Pat. No. 2,675,288, to Usher teaches an interchangeable utility table. The table is convertible into a drawing desk. The present disclosure differs from this prior art disclosure in that the prior art disclosure uses hinges to modify the table surface, does not use replaceable adhesives, does not provide a rounded edge for guiding a cutting wire or an embedded wire guide to define a cutting zone in a replaceable adhesive, and doesn't allow for both sides of the tabletop to be attached to the base. This prior art disclosure is pertinent and may benefit from the devices disclosed herein and is hereby incorporated for reference in its entirety for all that it teaches.

United States patent publication number 20070039101, to Luginbuhl, et al., teaches specialized tabletops for medical imaging. Interchangeable specialized tabletops are provided, each constructed for specific uses, such as tomographic imaging. The present disclosure differs from this prior art disclosure in that the prior art disclosure does not attach the tabletops by replaceable adhesives, does not provide a rounded edge for guiding a cutting wire or an embedded wire guide to define a cutting zone in a replaceable adhesive, and the two sides of each tabletop are not both able to be attached to the table base. This prior art disclosure is pertinent and may benefit from the devices disclosed herein and is hereby incorporated for reference in its entirety for all that it teaches.

U.S. Pat. No. 5,131,105, to Harrawood, et al., teaches a patient support table. The table consists of interchangeable table supports and tabletops that are x-ray translucent. The present disclosure differs from this prior art disclosure in that the prior art disclosure does not attach the tabletops by replaceable adhesives, does not provide a rounded edge for guiding a cutting wire or an embedded wire guide to define a cutting zone in a replaceable adhesive, and the two sides of each tabletop are not both able to be attached to the table base. This prior art disclosure is pertinent and may benefit from the devices disclosed herein and is hereby incorporated for reference in its entirety for all that it teaches.

U.S. Pat. No. 1,361,420, to Van Dolsen teaches an operating table with interchangeable tabletops. The tabletops are held on with pins and only have one usable surface. The present disclosure differs from this prior art disclosure in that the prior art disclosure does not attach the tabletops by replaceable adhesives, does not provide a rounded edge for guiding a cutting wire or an embedded wire guide to define a cutting zone in a replaceable adhesive, and the two sides of each tabletop are not both able to be attached to the table base. This prior art disclosure is pertinent and may benefit from the devices disclosed herein and is hereby incorporated for reference in its entirety for all that it teaches.

U.S. Pat. No. 3,241,885, to Deaton, teaches modular furniture and components thereof. This is sectional furniture with multiple components that are usable together, including tabletops and table bases that can be mixed and matched. The present disclosure differs from this prior art disclosure in that the prior art disclosure attaches the tabletops by permanent adhesives, does not provide a rounded edge for guiding a cutting wire or an embedded wire guide to define a cutting zone in a replaceable adhesive, and the two sides of each tabletop are not both able to be attached to the table base. This prior art disclosure is pertinent and may benefit from the devices disclosed herein and is hereby incorporated for reference in its entirety for all that it teaches.

U.S. Pat. No. 5,865,129, to Samples, teaches a knockdown table consisting of a top frame and attachable legs. The top frame has a lip that can hold a tabletop. The present disclosure differs from this prior art disclosure in that the prior art disclosure does not attach the tabletops by replaceable adhesives, does not provide a rounded edge for guiding a cutting wire or an embedded wire guide to define a cutting zone in a replaceable adhesive, and the two sides of each tabletop are not both able to be attached to the table base. This prior art disclosure is pertinent and may benefit from the devices disclosed herein and is hereby incorporated for reference in its entirety for all that it teaches.

U.S. Pat. No. 1,649,388, to Frank, teaches a changeable-top table. The present disclosure differs from this prior art disclosure in that the prior art disclosure does not attach the tabletops by replaceable adhesives, does not provide a rounded edge for guiding a cutting wire or an embedded wire guide to define a cutting zone in a replaceable adhesive, and the two sides of each tabletop are not both able to be attached to the table base. This prior art disclosure is pertinent and may benefit from the devices disclosed herein and is hereby incorporated for reference in its entirety for all that it teaches.

U.S. Pat. No. 8,480,091, to Florence, teaches a gaming table with interchangeable layouts. The present disclosure differs from this prior art disclosure in that the prior art disclosure does not attach the tabletops by replaceable adhesives, does not provide a rounded edge for guiding a cutting wire or an embedded wire guide to define a cutting zone in a replaceable adhesive, and the two sides of each tabletop are not both able to be attached to the table base. This prior art disclosure is pertinent and may benefit from the devices disclosed herein and is hereby incorporated for reference in its entirety for all that it teaches.

U.S. Pat. No. 6,823,804, to Arnell, teaches an interchangeable tabletop. The present disclosure differs from this prior art disclosure in that the prior art disclosure does not attach the tabletops by replaceable adhesives, does not provide a rounded edge for guiding a cutting wire or an embedded wire guide to define a cutting zone in a replaceable adhesive, and the two sides of each tabletop are not both able to be attached to the table base. This prior art disclosure is pertinent and may benefit from the devices disclosed herein and is hereby incorporated for reference in its entirety for all that it teaches.

U.S. Pat. No. 2,922,505, to De Buigne, teaches an indexing table with an interchangeable rotatable table top with gear mechanisms that cause the table to rotate. The present disclosure differs from this prior art disclosure in that the prior art disclosure does not attach the tabletops by replaceable adhesives, does not provide a rounded edge for guiding a cutting wire or an embedded wire guide to define a cutting zone in a replaceable adhesive, and the two sides of each tabletop are not both able to be attached to the table base. This prior art disclosure is pertinent and may benefit from the devices disclosed herein and is hereby incorporated for reference in its entirety for all that it teaches.

SUMMARY

A table is disclosed. The table comprises a table base and tabletop. The table base comprises a top surface with a replaceable adhesive layer attached. The tabletop comprises a first usable side and a second usable side, the first usable side and the second usable side being alternately attached to the replaceable adhesive layer once the adhesive is cut, removed, and replaced. The top surface further comprises a rounded edge that acts to guide the entry of an adhesive cutting wire. The adhesive cutting wire may comprise hard particles such as a ceramic, hardened steel, cubic boron nitride, or diamond, or a combination thereof. The replaceable adhesive layer comprises embedded wire guides that define a cutting zone substantially the width of the cutting wire through the adhesive. The embedded wire guides restrict the cutting wire to the cutting zone while the adhesive is being cut, thereby allowing the first usable side and the second usable side to be alternately attached to the adhesive layer.

The replaceable adhesive layer comprises adhesive agents that are removable from the first usable side, the second usable side, and the top surface without damage to the first usable side, the second usable side, or the top surface. The adhesive agents may comprise natural rubber adhesives, olefins, silicones, synthetic rubber adhesives, acrylic adhesives, or combinations thereof.

The embedded wire guides may be situated a diameter of the wires from the table base. The rounded edge may begin below the top surface and slope up to a first end of the replaceable adhesive layer. The wire may be attached to rollers that cause the wire to pass through the replaceable adhesive layer. The rollers and the wires may be detachable. The wire may be attached to an axle, rod, spindle, shaft, or pivot, which may be caused to rotate such that the wire passes through the removable adhesive layer. The axle, rod, spindle, shaft, or pivot and the wire may be detachable.

The tabletop may comprise an elevated pattern or patterns, a recessed pattern or patterns, or a combination thereof on the first usable side, the second usable side, or the first and the second usable sides.

The first usable side may comprise a flush-mount touch screen computing device.

The first usable side may comprise a first smooth, uninterrupted surface and the second usable side may comprise a second smooth, uninterrupted surface.

The first usable side and the second usable side may comprise different materials. The first usable side and the second usable side may further comprise bamboo, hard wood, plywood, laminated plywood, laminates, rubber, vinyl, plastics, stainless steel, galvanized steel, carbon steel, black iron, pewter, copper, zinc, aluminum, glass, quartz, granite, marble, stone, ceramics, fiberboards, varnish, sealant, paint, or combinations thereof.

The table base may further comprise metal, wood, plastic, stone, glass, or combinations thereof.

The table may further comprise an electrical inlet or inlets, an electrical outlet or outlets, and an edge computer connection or connections in an edge or edges of the tabletop. The table may further comprise wiring passing through an interior portion of the tabletop between the edge computer connection or connections and a side computer connection or connections on the first usable side or the second usable side of the tabletop.

The first usable side may comprise a heating element or heating elements and the second usable side may comprise a cooling element or elements.

The first usable side and the second usable side may comprise different uses, the uses selected from the group consisting of computer usage, office work, drafting, art, cutting, metal working, working with tools, cooking, dining, gaming, conferencing, displaying, medical, massage, or combinations thereof.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 2A-E show isometric views of a table, a side view of the table, and use of a rounded edge and embedded wire guide.

FIGS. 3A-E show an isometric view of a table, a side view of one corner of the table, a top view of the same corner of the table, and use of a rounded edge and embedded wire guide.

FIGS. 5A-E show isometric views of a table, a side view of the table, and use of a rounded edge and embedded wire guide.

FIGS. 6A-B show a table leg with rotating wire assembly.

DETAILED DESCRIPTION

Figure 1A:
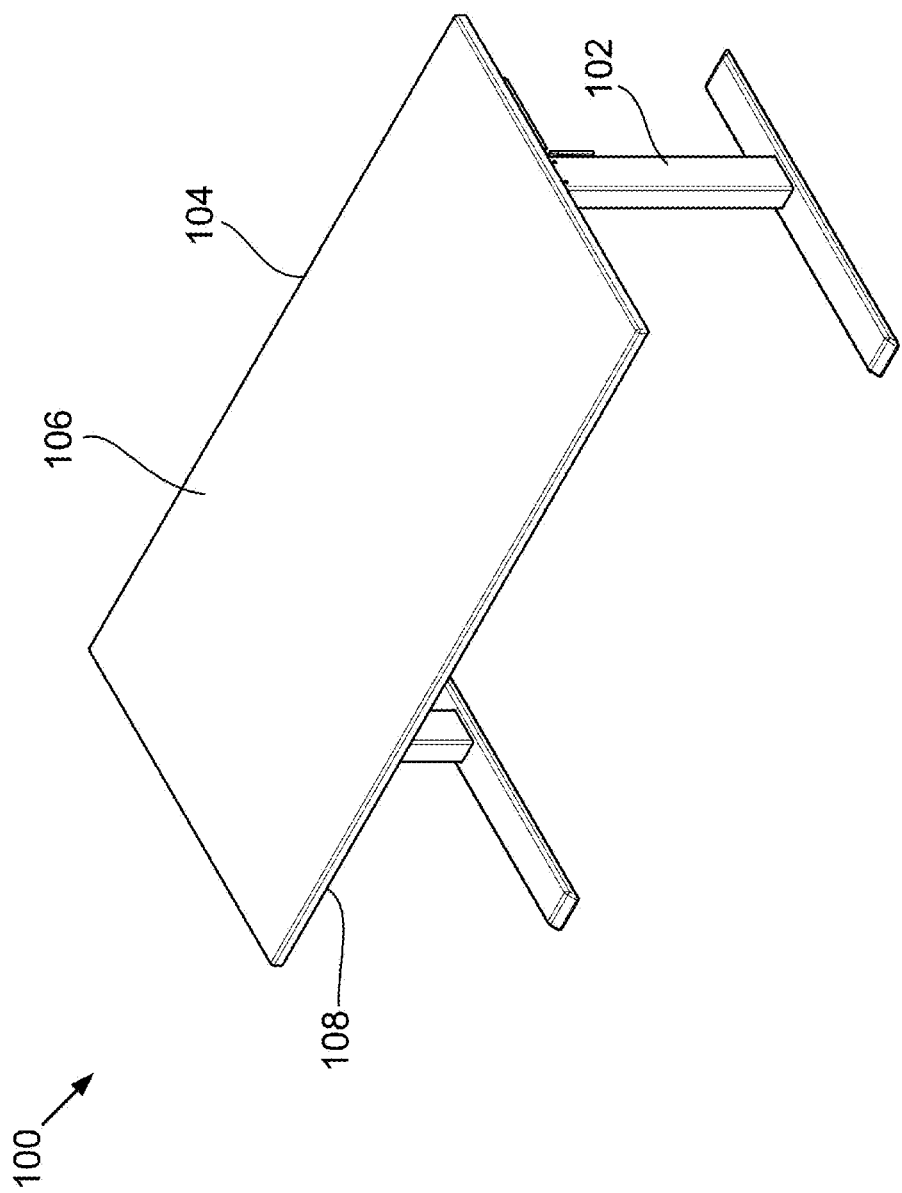
FIGS. 1A-D show an isometric view of a table, a side view of the table, and use of a rounded edge and embedded wire guide.
Figure 1B:
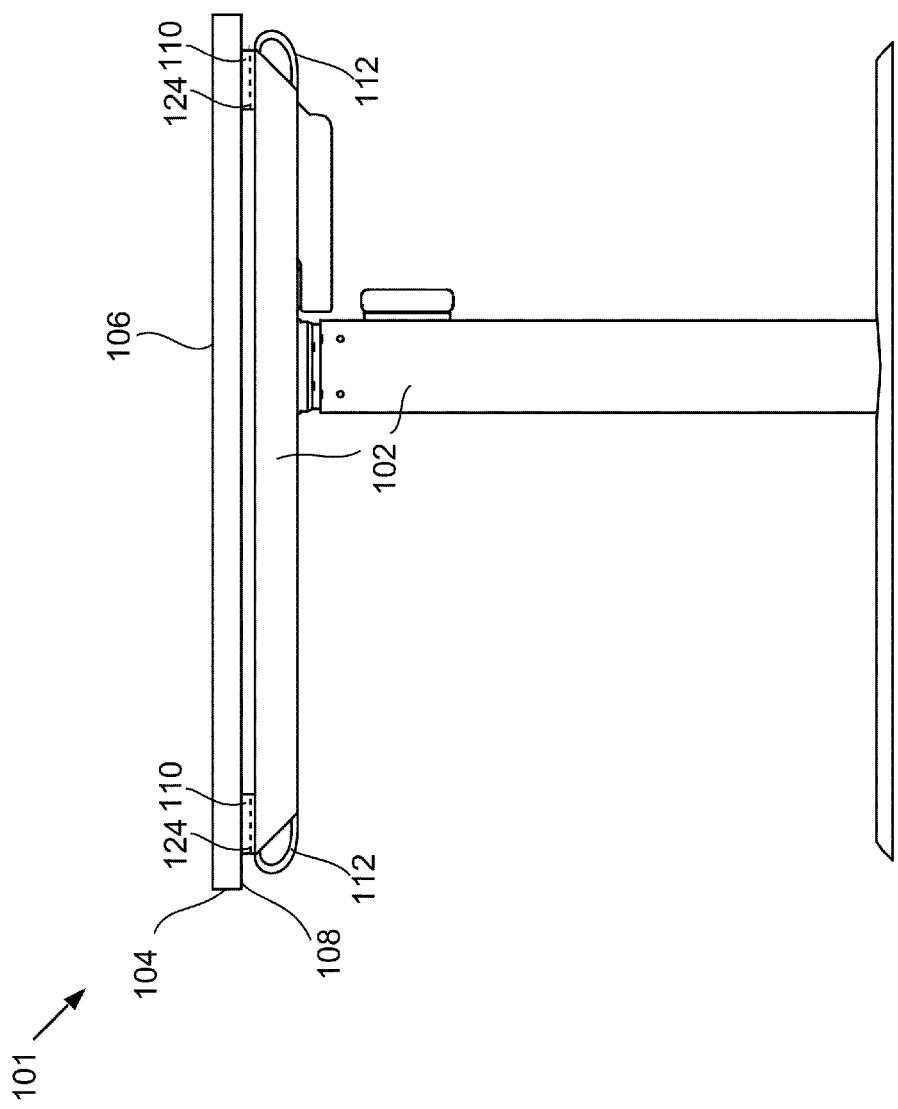
Figure 1C:
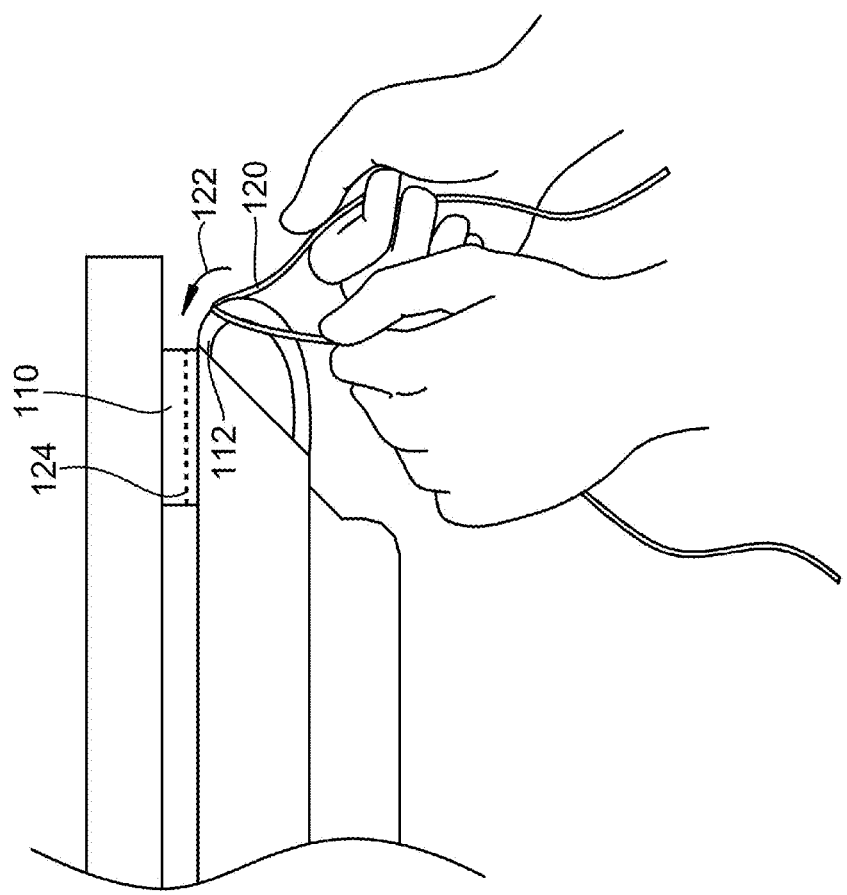
Figure 1D:
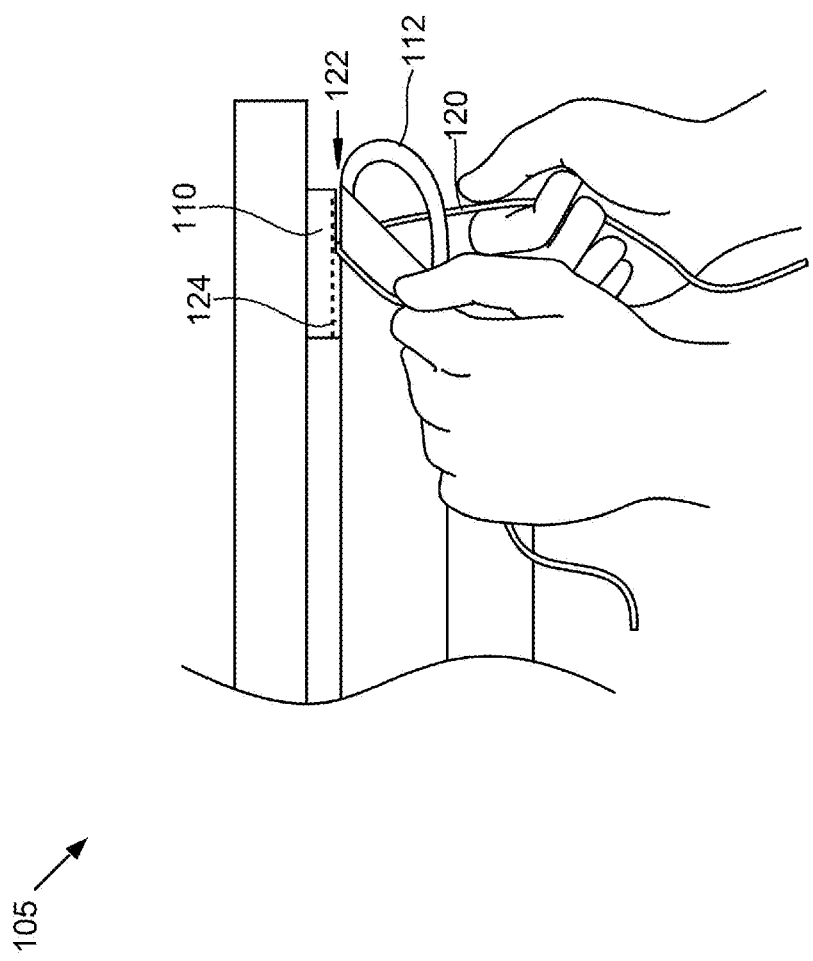
Figure 2A:
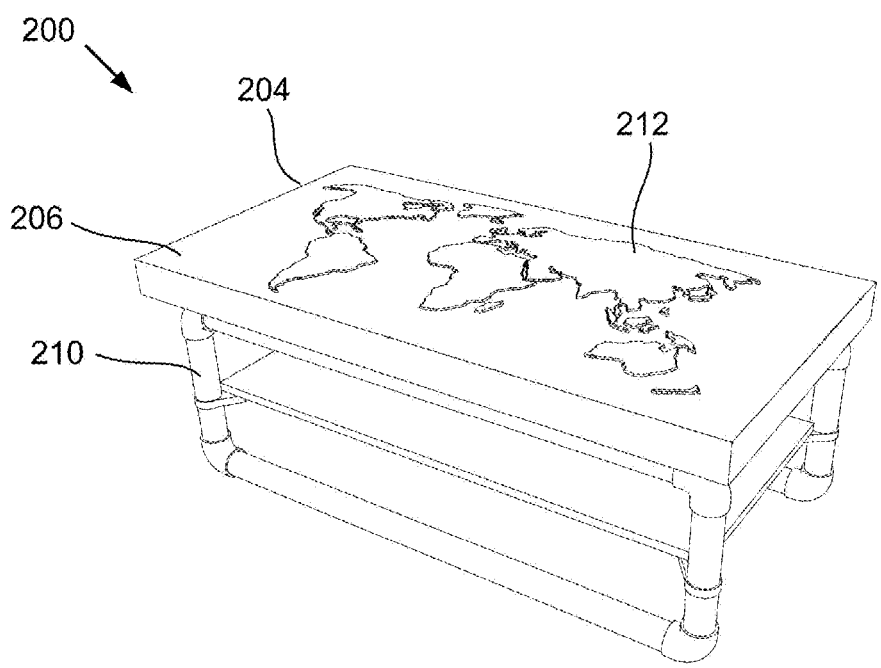
Figure 2B:
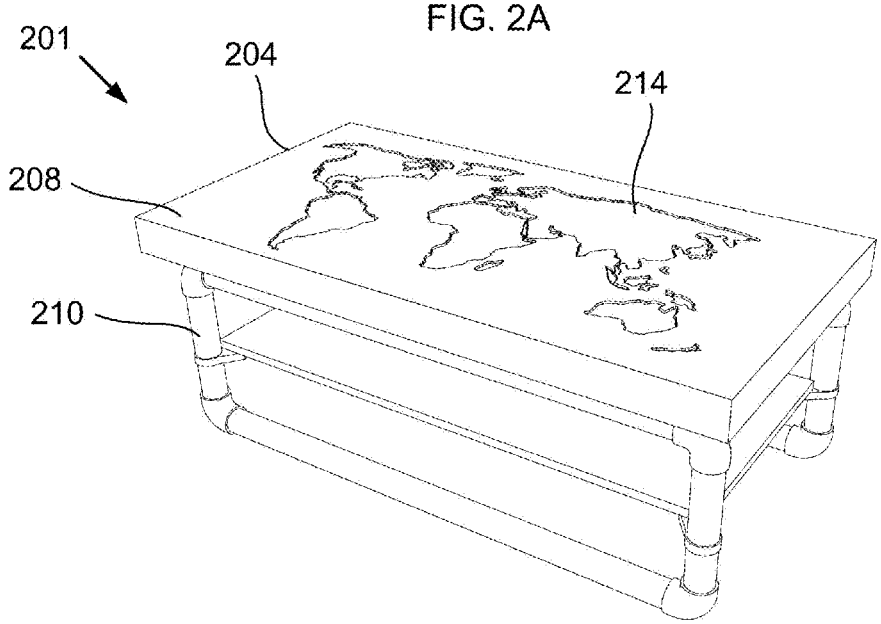
Figure 2C:
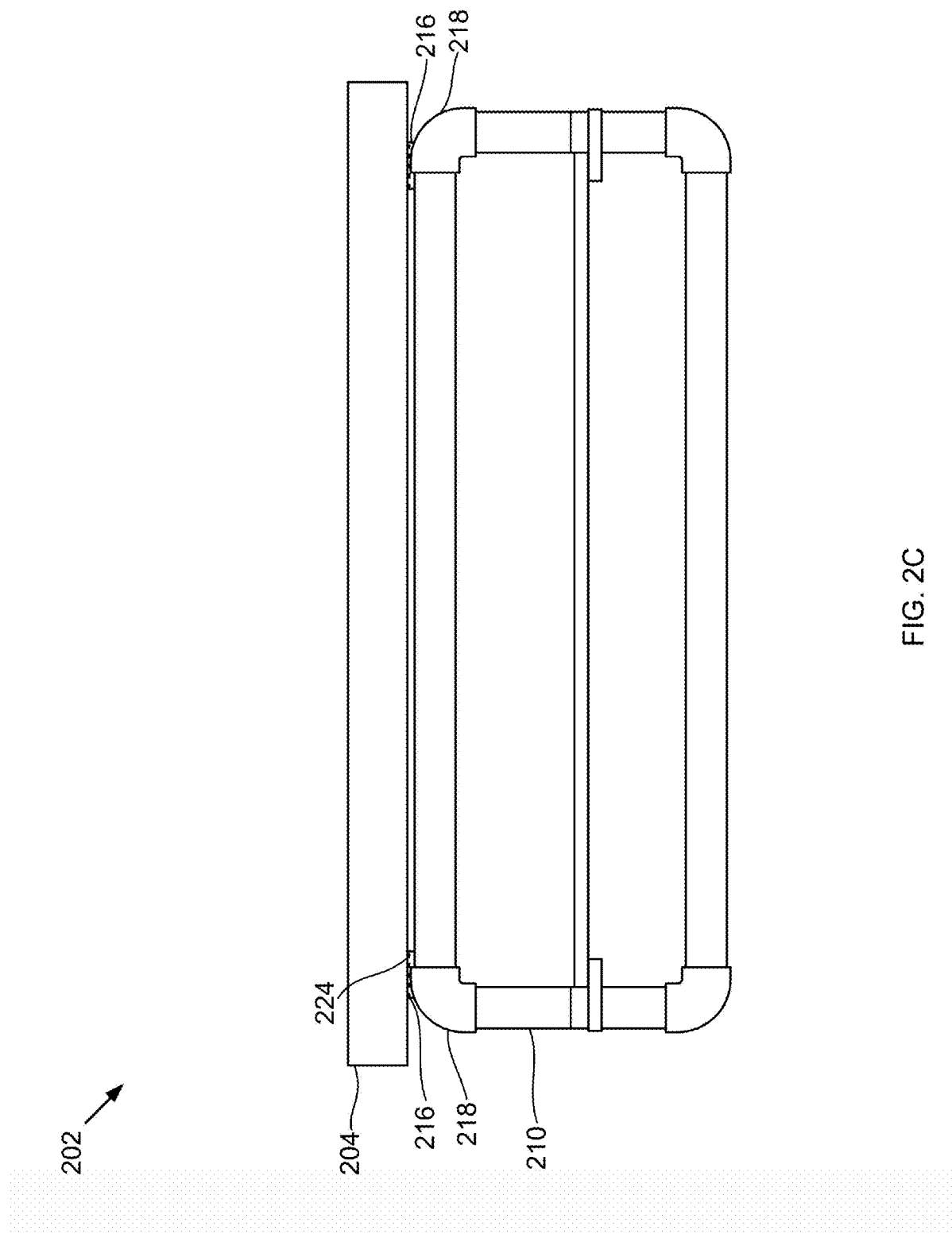

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Referring to FIGS. 1A-D, an isometric view of a table is shown at 100, a side view of the table is shown at 101, and use of a rounded edge and embedded wire guide is shown at 103 and 105, as per one embodiment of the present invention. A top surface of table base 102 is provided with replaceable adhesive layer 110. Table base 102 further comprises rounded edge 112. Tabletop 104 comprises first surface 106 and second surface 108. These surfaces are alternately mounted to table base 102 by means of replaceable adhesive layer 110. Passing wire 120 along path 122 defined by rounded edge 112 and through replaceable adhesive layer 110 cuts replaceable adhesive layer 110. The adhesive cutting wire may comprise hard particles such as a ceramic, hardened steel, cubic boron nitride, or diamond, or a combination thereof. Rounded edge 112 provides a smooth, clear path to begin wire 120 cutting replaceable adhesive layer 110. Replaceable adhesive layer 110 comprise embedded wire guide 124 resistant to cutting to further guide cutting. A new replaceable adhesive layer is applied to table base 102, and the alternate side of tabletop 104 is mounted. In some embodiments, the surfaces are both smooth and uninterrupted. In some embodiments, first surface 106 is metal and second surface 108 is bamboo. In other embodiments, first surface 106 is copper and second surface 108 is stainless steel. The thickness of replaceable adhesive layer 110 is exaggerated for clarity in FIG. 1B.

Referring to FIGS. 2A-E, isometric views of a table are shown at 200 and 201, a side view of the table is shown at 202, and use of a rounded edge and embedded wire guide is shown at 203 and 205, as per one embodiment of the present invention. Top surfaces of table base 210 are provided with replaceable adhesive layer 210. Replaceable adhesive layer 216 comprises embedded wire guide 224 resistant to cutting to guide cutting. Table base 210 further comprises pipe elbows 218, which act as rounded edges for guiding the wire to replaceable adhesive layer 216. Tabletop 204 comprises first surface 206 and second surface 208. These surfaces comprise raised relief map 212 and recessed map 214, respectively, and are alternately mounted to table base 210 by means of replaceable adhesive layer 216. Passing wire 220 along path 222 defined by pipe elbows 218 and through replaceable adhesive layer 216 cuts replaceable adhesive layer 216. A new replaceable adhesive layer is applied to table base 210, and the alternate side of tabletop 204 is mounted. Raised relief map 212 is not shown in side view 202 for clarity. The thickness of replaceable adhesive layer 216 is exaggerated for clarity in the figure.

Figure 3A:
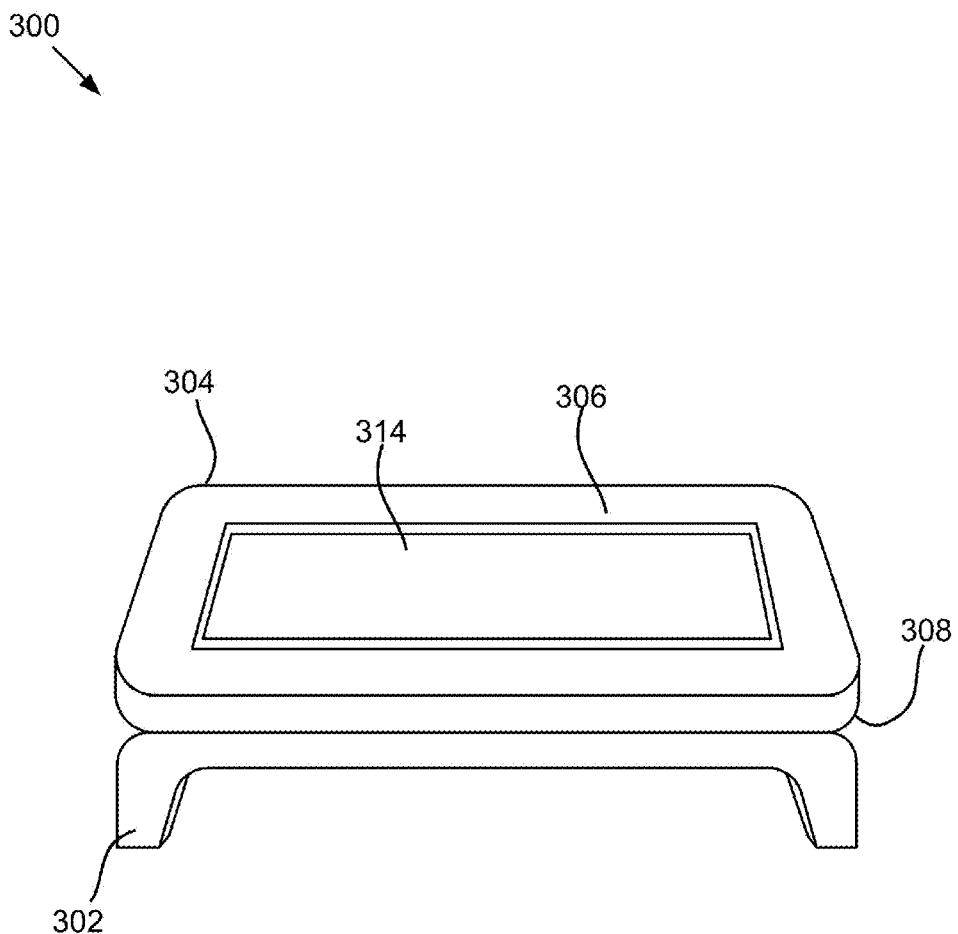
Figure 3C:
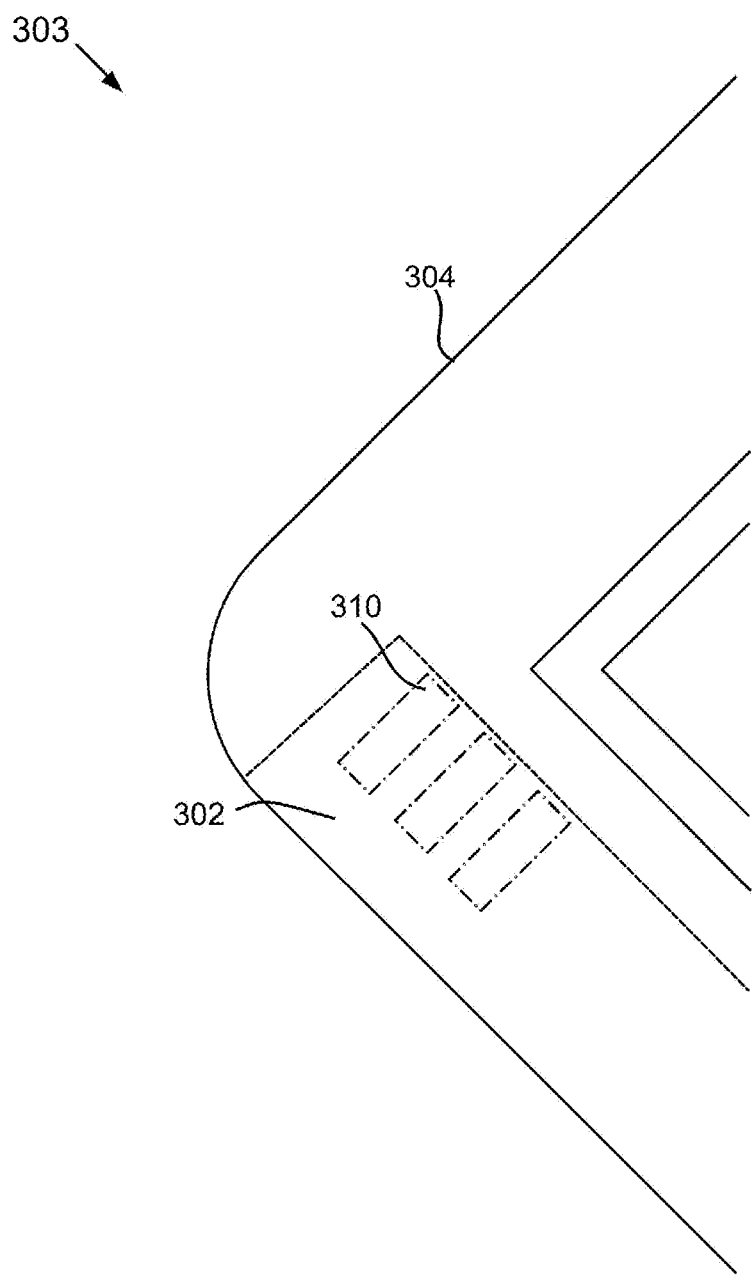
Figure 4A:
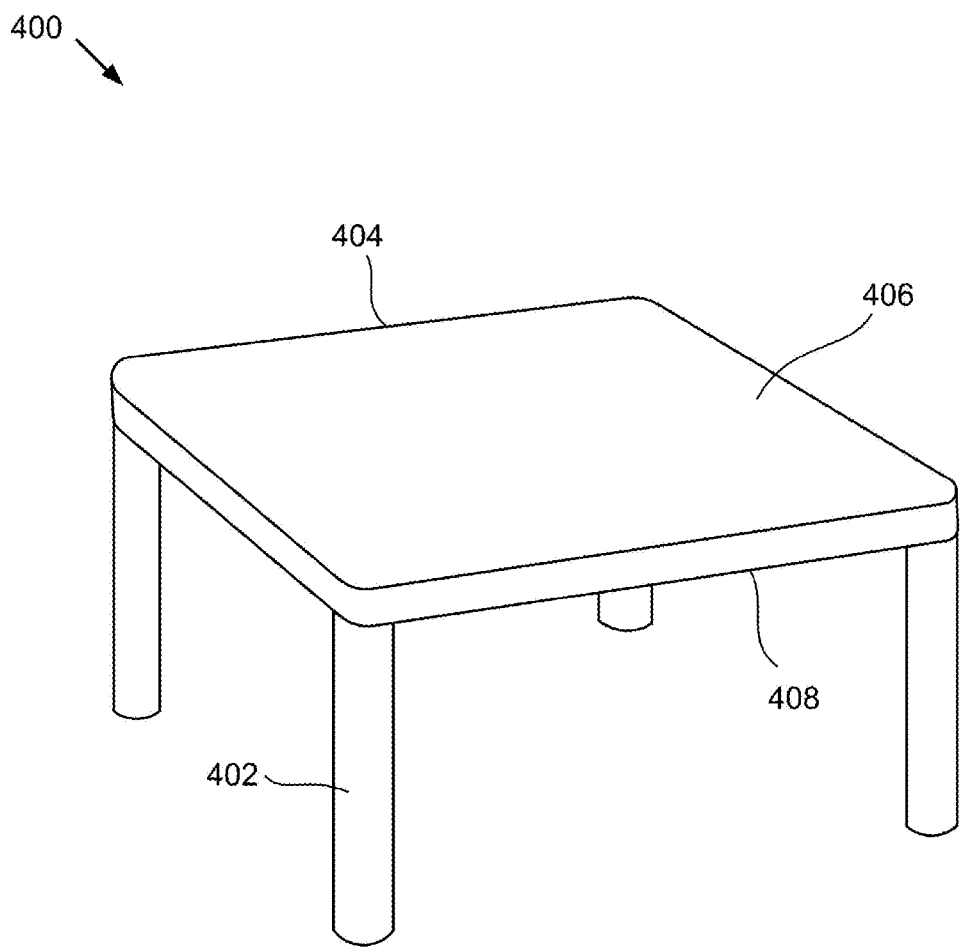
FIGS. 4A-D show an isometric view of a table, a cutaway side view of one corner of the table, and use of a rounded edge and embedded wire guide.
Figure 4B:
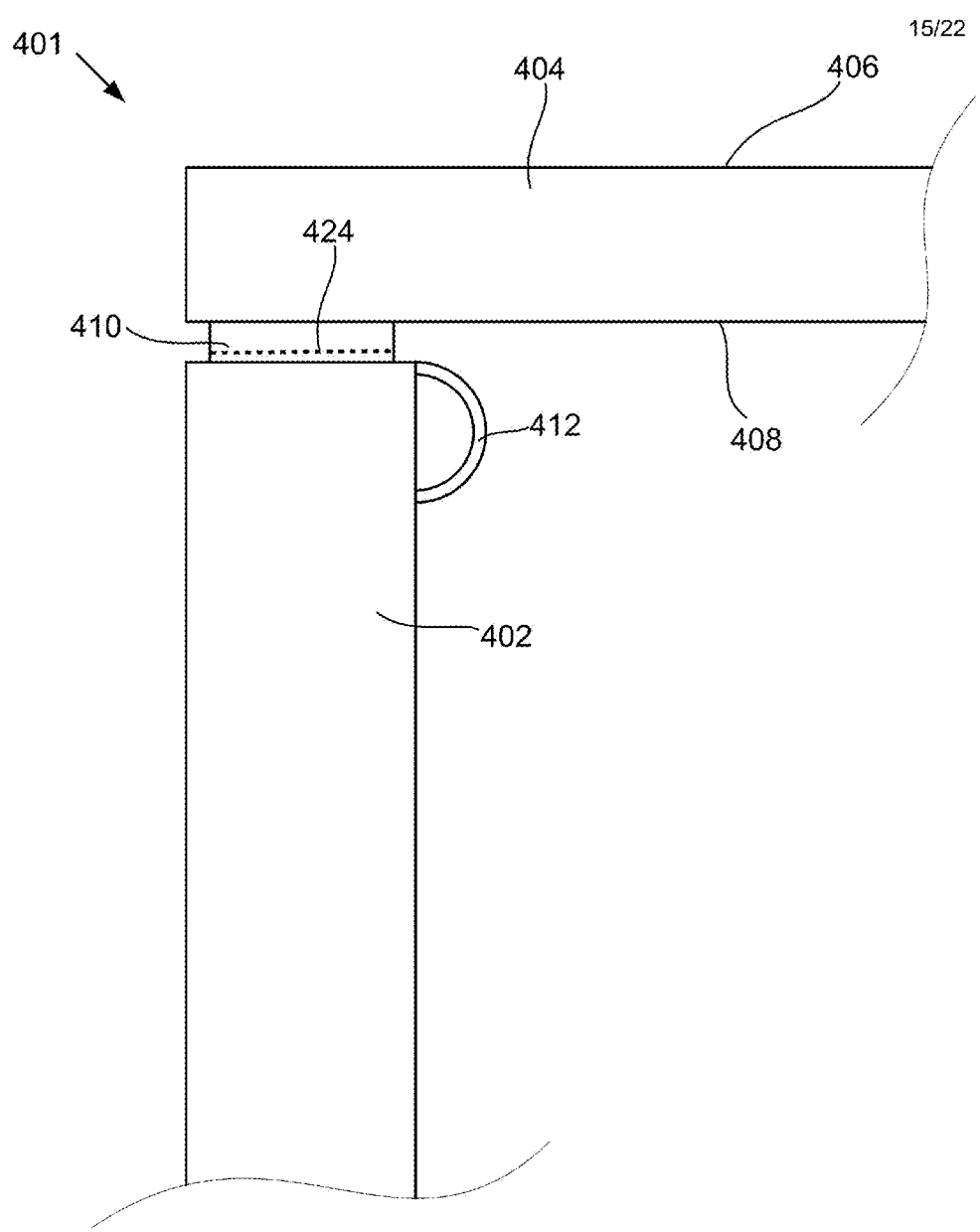
Figure 4C:
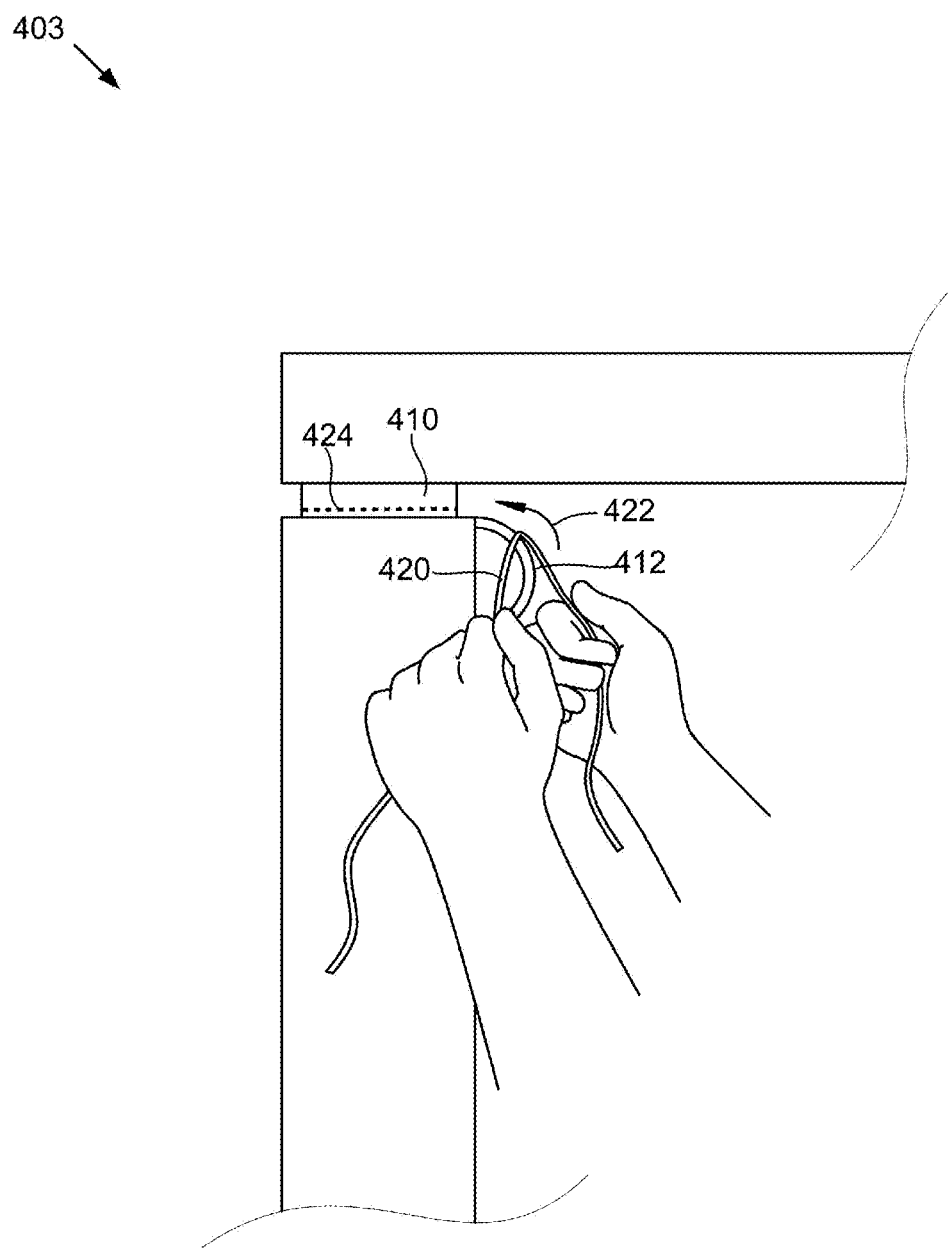
Figure 4D:
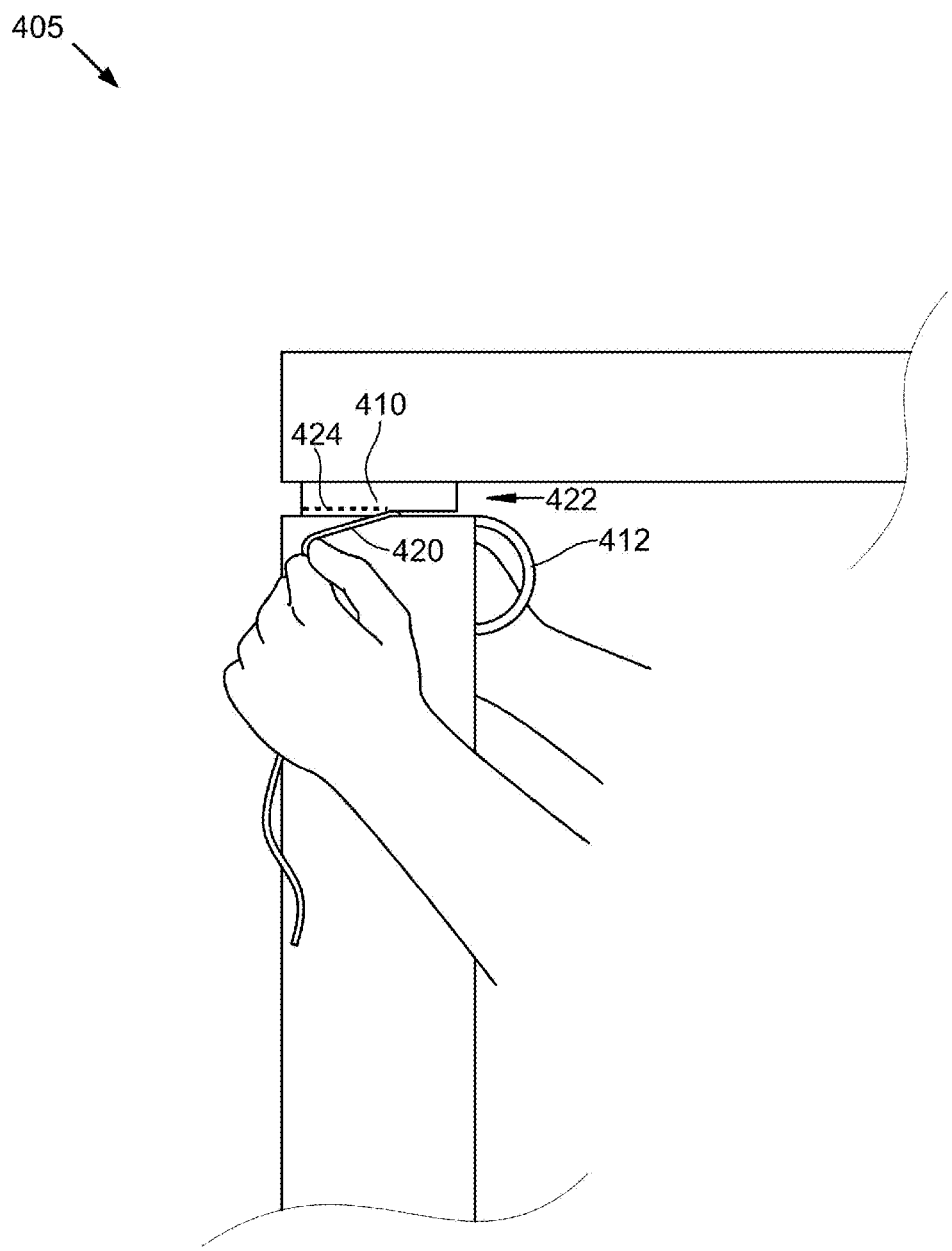
Figure 5C:
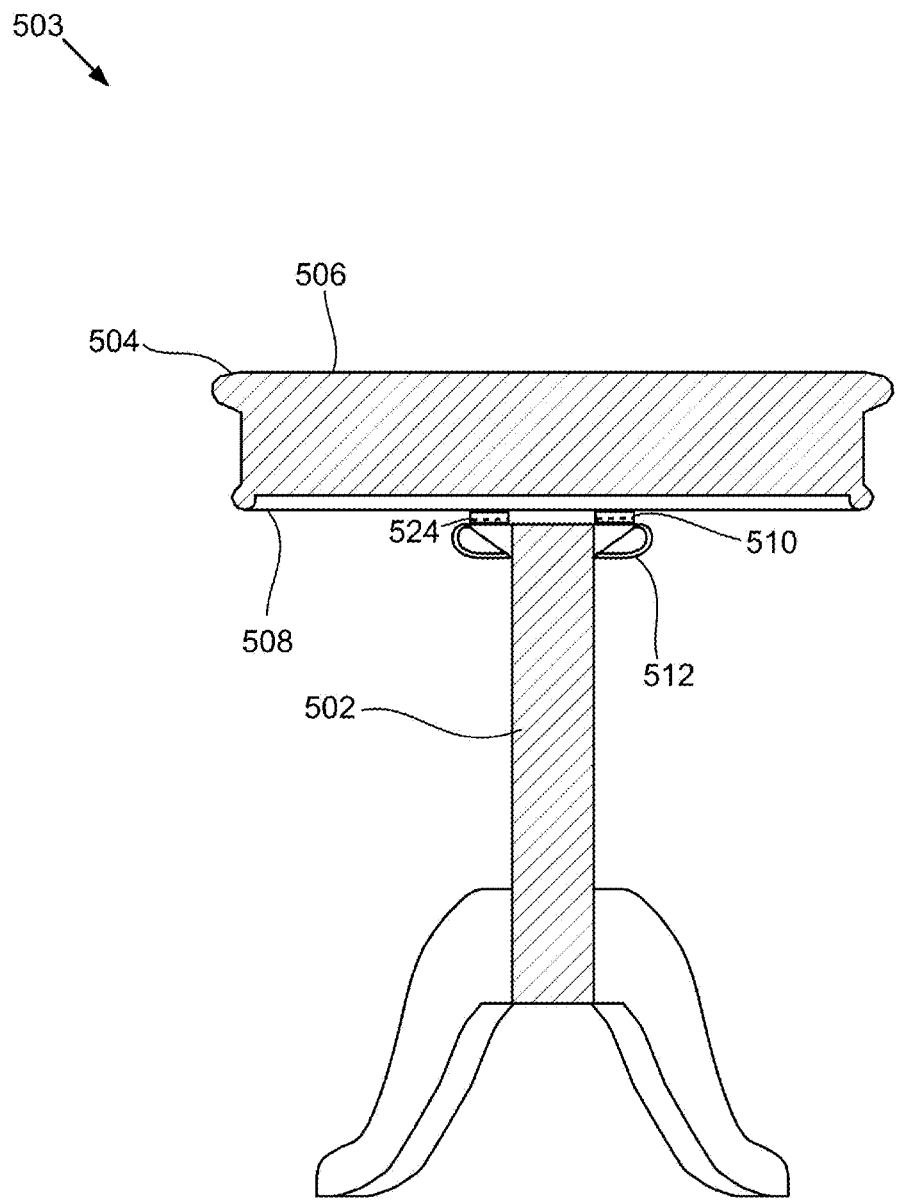
Figure 5D:
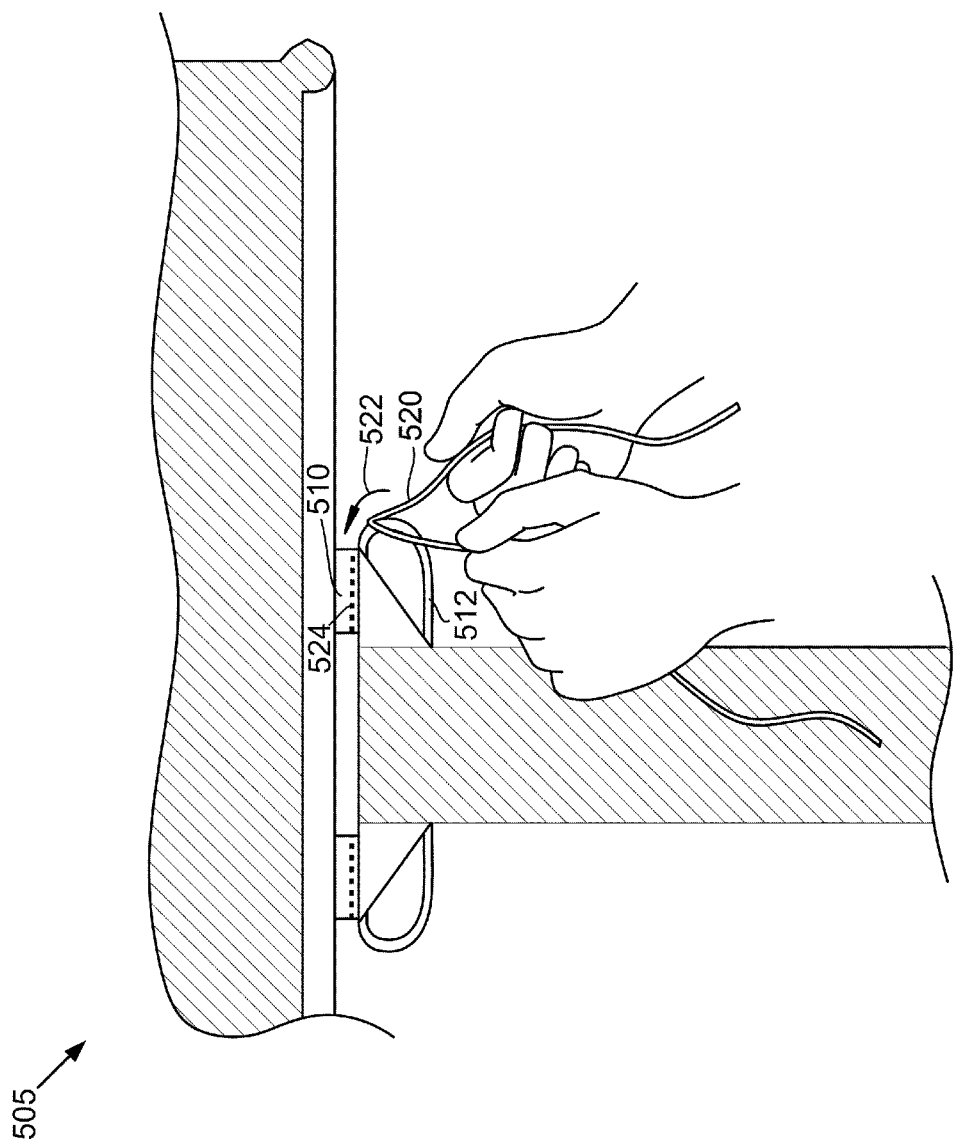
Figure 5E:
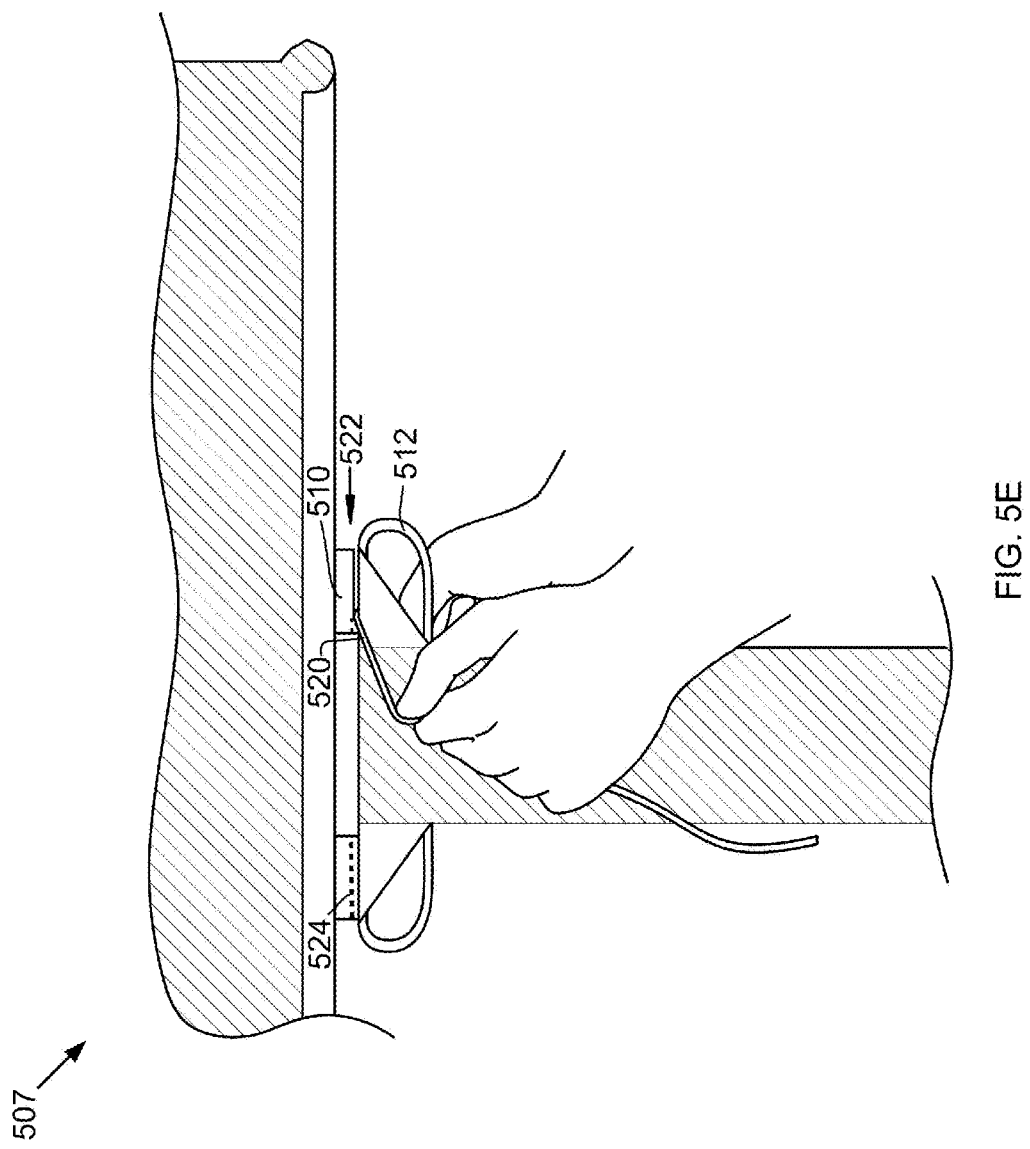

Referring to FIGS. 3A-C, an isometric view of a table is shown at 300, a side view of one corner of the table is shown at 301, a top view of the same corner of the table is shown at 303, and use of a rounded edge and embedded wire guide is shown at 305 and 307, as per one embodiment of the present invention. A top surface of table base 302 is provided with replaceable adhesive layer 310. Table base 302 further comprises rounded corners 312, which act to guide wire 320 to replaceable adhesive layer 310. Tabletop 304 comprises first surface 306 and second surface 308. These surfaces are alternately mounted to table base 302 by means of replaceable adhesive layer 310. Replaceable adhesive layer 310 comprises embedded wire guide 324 resistant to cutting to further guide cutting. Passing wire 320 along path 322 defined by rounded corners 312 and through replaceable adhesive layer 310 cuts replaceable adhesive layer 310. The adhesive cutting wire may comprise hard particles such as a ceramic, hardened steel, cubic boron nitride, or diamond, or a combination thereof. A new replaceable adhesive layer is applied to table base 302, and the alternate side of tabletop 304 is mounted. First surface 306 comprises flush-mount touchscreen computer monitor 314. Second surface 308 comprises a smooth, uninterrupted surface. In some embodiments, monitor 314 is an all-in-one, computer/monitor combination. In other embodiments, monitor 314 is a monitor requiring an external computer. In some embodiments, an edge of tabletop 304 contains inlets for electrical power as well as computer connections including USB, ethernet, HDMI, DisplayPort, and other standard computer ports. In some embodiments, an edge of tabletop 304 contains fans for removing heat from monitor 314. The thickness of replaceable adhesive layer 310 is exaggerated for clarity in the figure.

Referring to FIGS. 4A-D, an isometric view of a table is shown at 400, a cutaway side view of one corner of the table is shown at 401, and use of a rounded edge and embedded wire guide is shown at 403 and 405, as per one embodiment of the present invention. A top surface of table legs 402 is provided with replaceable adhesive layer 410. Table legs 402 further comprise rounded edges 412 to guide wire 420 to replaceable adhesive layer 410. Tabletop 404 comprises first surface 406 and second surface 408. These surfaces are alternately mounted to table legs 402 by means of replaceable adhesive layer 410. Replaceable adhesive layer 410 comprises embedded wire guide 424 resistant to cutting to further guide cutting. Passing wire 420 along path 422 defined by rounded edges 412 and through replaceable adhesive layer 410 cuts replaceable adhesive layer 410. A new replaceable adhesive layer is applied to table legs 402, and the alternate side of tabletop 404 is mounted. The thickness of replaceable adhesive layer 410 is exaggerated in side view 401 for clarity of drawing. In some embodiments, first surface 406 and second surface 408 are different materials.

Referring to FIGS. 5A-E, isometric views of a table are shown at 500 and 501, a side view of the table is shown at 503, and use of a rounded edge and embedded wire guide is shown at 505 and 507, as per one embodiment of the present invention. A top surface of table base 502 is provided with replaceable adhesive layer 510. Table base 502 further comprises rounded edges 512 which guide wire 520 to replaceable adhesive layer 510. Tabletop 504 comprises first surface 506 and second surface 508. These surfaces comprise backgammon and checkers, respectively, and are alternately mounted to table base 502 by means of replaceable adhesive layer 510. Passing wire 520 along path 522 defined by rounded edges 512 and through replaceable adhesive layer 510 cuts replaceable adhesive layer 510. The adhesive cutting wire may comprise hard particles such as a ceramic, hardened steel, cubic boron nitride, or diamond, or a combination thereof. Replaceable adhesive layer 510 comprises embedded wire guides 524 resistant to cutting to further guide cutting. A new replaceable adhesive layer is applied to table base 502, and the alternate side of tabletop 504 is mounted. Drawer 514 is blocked when first surface 506 is adhered to table base 502. Drawer 516 is blocked when second surface 508 is adhered to table base 502. In some embodiments, the adhesive agents used in replaceable adhesive layer 510 are removable from first surface 506, second surface 508, and the top surface of table base 502 without damage to any of the surfaces.

Referring to FIGS. 6A-B, a table leg with rotating wire assembly is shown at 600 and 601, as per one embodiment of the present invention. Table leg 602 with top surface 604 is provided. Top surface 604 has a replaceable adhesive layer attached (not shown) comprising an embedded wire guide resistant to cutting to guide cutting. A tabletop is attached to this replaceable adhesive layer (not shown). The replaceable adhesive layer can be cut by use of rotating wire assembly 606, comprising wire 608. Wire assembly 606 is rotated through path 610, causing wire 608 to pass through path 612. Path 612 passes through and cuts the replaceable adhesive layer. A new adhesive may then be applied and an opposite side of the same tabletop may be mounted.

In some embodiments, the replaceable adhesive layer comprises adhesive agents that are removable from the first side, the second side, and the top surface without damage to the first side, the second side, or the top surface. In some embodiments, the adhesive agents comprise natural rubber adhesives, olefins, silicones, synthetic rubber adhesives, acrylic adhesives, or combinations thereof.

In some embodiments, the wire guides are situated a diameter of the wires from the tabletop when the tabletop is mounted to the table base. In some embodiments, the wire guides begin below the attachment points, slope up to a first end of the attachment points at the diameter of the wires away from the tabletop, continue at the diameter away from the tabletop to a second end of the attachment points, and slope down below the attachment points. In some embodiments, the wire guides are attached to rollers with the wires mounted on the wire guides, wherein the wire guide is caused to roll along the rollers such that the wires pass through the replaceable adhesive layer. In some embodiments, the rollers, the wires, and the wire guides are detachable.

In other embodiments, the wire guides are attached to an axle, rod, spindle, shaft, or pivot with the wires mounted on the wire guides, wherein the wire guides are caused to rotate such that the wires pass through the replaceable adhesive layer. In some embodiments, the axle, rod, spindle, shaft, or pivot, the wires, and the wire guides are detachable.

In some embodiments, the tabletop comprises an elevated pattern or patterns, a recessed pattern or patterns, or a combination thereof on the first side, the second side, or the first and the second side.

In some embodiments, the first side comprises a flush-mount touch screen computing device.

In some embodiments, the first side comprises a first smooth, uninterrupted surface and the second side comprises a second smooth, uninterrupted surface.

In some embodiments, the first side and the second side comprise different materials. In some embodiments, the first side and the second side further comprise bamboo, hard wood, plywood, laminated plywood, laminates, rubber, vinyl, plastics, stainless steel, galvanized steel, carbon steel, black iron, pewter, copper, zinc, aluminum, glass, quartz, granite, marble, stone, ceramics, fiberboards, varnish, sealant, paint, or combinations thereof. In some embodiments, the table base further comprises metal, wood, plastic, stone, glass, or combinations thereof.

In some embodiments, the table further comprises an electrical inlet or inlets, an electrical outlet or outlets, and an edge computer connection or connections in an edge or edges of the tabletop. In some embodiments, the table further comprises wiring passing through an interior portion of the tabletop between the edge computer connection or connections and a side computer connection or connections on the first side or the second side of the tabletop.

In some embodiments, the first side comprises a heating element or heating elements and the second side comprises a cooling element or elements.

In some embodiments, the first side and the second side comprise different uses, the uses selected from the group consisting of computer usage, office work, drafting, art, cutting, metal working, working with tools, cooking, dining, gaming, conferencing, displaying, medical, massage, or combinations thereof.

The invention claimed is:

1. A table comprising:
a table base comprising a top surface;
a replaceable adhesive layer attached to the top surface;
a tabletop comprising a first usable side and a second usable side, the first usable side and the second usable side being alternately attached to the replaceable adhesive layer once the adhesive is cut, removed, and replaced;
the top surface further comprising a rounded edge that acts to guide the entry of an adhesive cutting wire; and,
the replaceable adhesive layer comprising embedded wire guides that define a cutting zone substantially the width of the cutting wire through the adhesive, wherein the embedded wire guides restrict the cutting wire to the cutting zone while the adhesive is being cut, thereby allowing the first usable side and the second usable side to be alternately attached to the adhesive layer.

2. The table of claim 1, wherein the replaceable adhesive layer comprises adhesive agents that are removable from the first side, the second side, and the top surface without damage to the first side, the second side, or the top surface.

3. The table of claim 2, wherein the adhesive agents comprise natural rubber adhesives, olefins, silicones, synthetic rubber adhesives, acrylic adhesives, or combinations thereof.

4. The table of claim 1, wherein the embedded wire guides are situated a diameter of the wires from the table base.

5. The table of claim 4, wherein the rounded edge begins below the top surface and slope up to a first end of the replaceable adhesive layer.

6. The table of claim 1, wherein the wire is attached to rollers that cause the wire to pass through the replaceable adhesive layer.

7. The table of claim 6, wherein the rollers and the wires are detachable.

8. The table of claim 1, wherein the wire is attached to an axle, rod, spindle, shaft, or pivot, which is caused to rotate such that the wire passes through the removable adhesive layer.

9. The table of claim 8, wherein the axle, rod, spindle, shaft, or pivot and the wire are detachable.

10. The table of claim 1, wherein the tabletop comprises an elevated pattern or patterns, a recessed pattern or patterns, or a combination thereof on the first usable side, the second usable side, or the first and the second usable sides.

11. The table of claim 1, wherein the first usable side comprises a flush-mount touch screen computing device.

12. The table of claim 1, wherein the first usable side comprises a first smooth, uninterrupted surface and the second usable side comprises a second smooth, uninterrupted surface.

13. The table of claim 1, wherein the first usable side and the second usable side comprise different materials.

14. The table of claim 13, wherein the first usable side and the second usable side further comprise bamboo, hard wood, plywood, laminated plywood, laminates, rubber, vinyl, plastics, stainless steel, galvanized steel, carbon steel, black iron, pewter, copper, zinc, aluminum, glass, quartz, granite, marble, stone, ceramics, fiberboards, varnish, sealant, paint, or combinations thereof.

15. The table of claim 1, wherein the table base further comprises metal, wood, plastic, stone, glass, or combinations thereof.

16. The table of claim 1, further comprising an electrical inlet or inlets, an electrical outlet or outlets, and an edge computer connection or connections in an edge or edges of the tabletop.

17. The table of claim 1, wherein the first usable side comprises a heating element or heating elements and the second usable side comprises a cooling element or elements.

18. The table of claim 1, wherein the first usable side and the second usable side comprise different uses, the uses selected from the group consisting of computer usage, office work, drafting, art, cutting, metal working, working with tools, cooking, dining, gaming, conferencing, displaying, medical, massage, or combinations thereof.

19. A table comprising:
 a table base comprising a top surface;
 a replaceable adhesive layer attached to the top surface, comprising adhesive agents that are removable from a first usable side, a second usable side, and the top surface without damage to the first usable side, the second usable side, or the top surface;
 a table top comprising the first usable side and the second usable side, the first usable side and the second usable side being alternately attached to the replaceable adhesive layer once the adhesive is cut, removed, and replaced, wherein:
  the first usable side and the second usable side comprise different materials; and,
  the first usable side and the second usable side further comprise bamboo, hard wood, plywood, laminated plywood, laminates, rubber, vinyl, plastics, stainless steel, galvanized steel, carbon steel, black iron, pewter, copper, zinc, aluminum, glass, quartz, granite, marble, stone, ceramics, fiberboards, varnish, sealant, paint, or combinations thereof;
 the top surface further comprising a rounded edge that acts to guide the entry of an adhesive cutting wire; and,
 the replaceable adhesive layer comprising embedded wire guides that define a cutting zone substantially the width of the cutting wire through the adhesive, wherein the embedded wire guides restrict the cutting wire to the cutting zone while the adhesive is being cut, thereby allowing the first usable side and the second usable side to be alternately attached to the adhesive layer.

20. The table of claim 1, wherein the adhesive cutting wire comprises hard particles selected from the group consisting of hardened steel, ceramic, cubic boron nitride, and diamond, and combinations thereof.

\* \* \* \* \*